United States Patent
Machado

(10) Patent No.: US 7,681,854 B2
(45) Date of Patent: Mar. 23, 2010

(54) DEVICE FOR SECURING AN INSERT IN A STRUCTURE

(75) Inventor: Stephane Machado, Villeneuve-Tolosanne (FR)

(73) Assignee: Airbus France, Toulouse (FR)

( * ) Notice: Subject to any disclaimer, the term of this patent is extended or adjusted under 35 U.S.C. 154(b) by 42 days.

(21) Appl. No.: 11/561,171

(22) Filed: Nov. 17, 2006

(65) Prior Publication Data
US 2008/0042007 A1  Feb. 21, 2008

(30) Foreign Application Priority Data
Nov. 17, 2005  (FR) .................................. 05 53493

(51) Int. Cl.
*F16M 11/32*  (2006.01)
(52) U.S. Cl. .................... 248/440.1; 411/315
(58) Field of Classification Search ............. 411/315, 411/200; 292/318; 248/158, 163.1, 163.2, 248/440.1
See application file for complete search history.

(56) References Cited

U.S. PATENT DOCUMENTS

| | | | | |
|---|---|---|---|---|
| 1,379,606 A | * | 5/1921 | Chauncey | .................... 411/87 |
| 3,923,349 A | * | 12/1975 | Herbst | ........................ 384/215 |
| 3,965,954 A | * | 6/1976 | Lofredo | ........................ 411/213 |
| 4,065,077 A | | 12/1977 | Brooks | |
| 4,494,710 A | * | 1/1985 | Harris et al. | ................. 242/156 |
| 4,889,458 A | * | 12/1989 | Taylor | ......................... 411/383 |
| 6,000,891 A | * | 12/1999 | Cowell, Jr. | ................... 411/315 |

FOREIGN PATENT DOCUMENTS

| | | |
|---|---|---|
| DE | 199 05 299 | 8/1999 |
| EP | 0 309 129 | 3/1989 |

\* cited by examiner

*Primary Examiner*—Amy J Sterling
(74) *Attorney, Agent, or Firm*—Perman & Green, LLP

(57) ABSTRACT

The invention concerns a device for securing an insert in a structure having a first opening, the insert having a principal body (20) inserted in the first opening, the body (20) having a second opening having a principal axis, the device including a shaft (23) designed to pass through the second opening and at least one detachable or non-detachable head (24, 42).

According to the invention, this device includes at least one roughly planar part (25, 26, 43) having a third opening, the part being designed to be positioned on an outer face of the structure (21, 22) so that the third opening is centered on the second opening for the passage of the shaft (23), the part (25, 26, 43) locking the insert in the first opening, a system for blocking the part (25, 26, 43) from rotating relative to the principal body (20), and an element for joining the head onto the part (25, 26, 43) for locking the head onto the part, the head being designed to be supported against the part (25, 26, 43) to secure the part against the outer surface.

9 Claims, 5 Drawing Sheets

DEVICE FOR SECURING AN INSERT IN A STRUCTURE

CROSS-REFERENCE TO RELATED APPLICATIONS

This application claims priority from French Patent Application No. 05 53493 filed on Nov. 17, 2005.

FIELD

The present invention concerns a device for securing an insert in a structure having an opening, this insert being inserted in said opening. This device is particularly designed for the field of aeronautics and in particular for the attachment of an engine mount rod to an engine mount yoke.

RELATED DEVELOPMENTS

Systems are known for attaching an insert in an engine mount yoke. This insert is designed to receive the end of an engine mount rod in order to permit pivoting this rod around the insert.

FIG. 1 shows such an attachment system of the prior art for an engine/mechanical system interface. Two engine mount lugs 1, 2 spaced apart from one another form the yoke. Each of these lugs 1, 2 has a drilled hole for passage of an insert 3, these drilled holes having the same longitudinal axis. These drilled holes therefore define with the spacing of said lugs an opening having a longitudinal axis. Insert 3 is a hollow tubular piece that is inserted in this opening to receive in rotation an end 5 of an engine mount rod 4. This end 5, called rod head, is thus made to pivot around insert 3.

FIG. 2 is a sectional view of FIG. 1 showing the system for attaching insert 3 to the structure formed by the yoke. Two outer washers 6, 7 each having an opening, are positioned on the outer surface of lugs 1, 2 so as to lock insert 1\* in position in the opening. Moreover, in order to assure the centering of shaft 8 of the attachment screw in the hollow part of insert 1\*, two inner washers 9 each having an opening, are received in cavities provided for this purpose at the ends of insert 1\*. Shaft 8 of the screw thus passes through inner washers 9 and outer washers 6, 7.

In order to lock the assembly of these elements in position, the screw has a head 10 that is supported against one of the outer washers 6 and a nut 11 is placed at the other end of shaft 8 for support against the other outer washer 7.

In the aeronautics industry, it is imperative, however, for attachment systems belonging to Class 1 to integrate a security device to prevent any possible rotation of nut 11 and screw head 10 so as to prevent possible loosening of these elements. Such a loosening could, in fact, lead to a separation of the head of rod 5 from yoke 1, 2.

Now, in the example described in FIGS. 1 and 2, the rotation movement of rod head 5 can cause rotation of the body of insert 3 by friction, which may possibly lead to a loosening of screw head 10 and of nut 11. Shaft 8 receiving nut 11 can also cause such a loosening during strong vibrations of the system.

Devices are known that permit preventing a nut from loosening, such as self-locking nuts or even washers having projections, also called toothed washers.

During maintenance operations, however, this type of washer can prove dangerous for the operator, for example, by inducing a tear of his protection coveralls when the aircraft has been exposed to radiation or dangerous chemicals.

An anti-loosening device for the screw and the nut is also known, as shown schematically in FIGS. 3 and 4, permitting a resolution of this problem. This device comprises a U-shaped fork 12 having two arms 13, 14, the ends of which take support on the outer surfaces of the lugs of the yoke (not shown) so as to lock insert 3 in position in the opening. These arms 13, 14 thus act like outer washers 6, 7 described above and also receive screw head 10 and nut 11 to hold them in position. These arms 13, 14 therefore each have a drilled hole for the passage of shaft 8 of the attachment screw.

Onto each arm 13, 14 of fork 12 is also attached a profiled section 15, one end of which has an opening for retaining shaft head 10 or nut 11, so as to lock these elements. These profiled sections 15 are fastened to arms 13, 14 of fork 12 by fastening components 16.

However, it was observed that U-shaped fork 12 was free to pivot around insert 3 and could thus come into contact with the body of the rod and possibly damage it.

Moreover, this device is not satisfactory with regard to its weight; in fact, it makes the attachment system heavier by adding additional metal parts to it. It therefore leads to an additional fuel consumption for the aircraft.

This device also takes up a large space laterally, which is not adapted to the engine mount system of the state of the art, which leaves little useful space for fastening an engine mount.

Thus, the present invention proposes a device for securing an insert to a structure having an opening, which is simple in its design and in its operating mode, compact and light, of great reliability with a low cost, and which permits immobilizing this insert in the opening of the structure without the fastening elements of the screw and nut type being able to separate.

SUMMARY

For this purpose, the subject of the invention is a device for securing an insert in a structure comprising a first opening, the insert comprising a principal body inserted in said first opening, this body having a second opening having a principal axis, the device comprising a shaft designed to pass through this second opening and at least one head, detachable or not.

According to the invention the device comprises:

at least one roughly planar part having a third opening, this part being designed to be positioned on an outer face of the structure in such a way that the third opening is centered on the second opening for the passage of the shaft, this part locking the insert in the first opening, a system for blocking the rotation of said part relative to said principal body, and an element for connecting the head onto the part for locking this head onto the part, the head being designed to be supported against this part to fasten the part to the outer surface.

By "detachable head" is meant a nut or thin elongated metal part designed to be inserted into a drilled hole of said shaft provided for this purpose in order to lock the part against the outer surface of the structure. A non-detachable head is a head preferably having an inset for a tool and forming a single piece with the shaft.

In different particular embodiments of this securing device, each having its particular advantages and susceptible to numerous possible technical combinations:

The principal body comprises at least one projection or one recess positioned on at least one of its ends, while the locking system comprises at least one corresponding recess or projection positioned on said part, the corresponding projections and recesses cooperating to join said part and said body.

Joining can be achieved, for example, by inserting the projection in the corresponding recess. It can also be obtained by forcefully fitting the projection into the recess, carried out by the operator.

The principal body is hollow and has at least one longitudinal bead on its inner surface, and this locking system has at least one centering washer comprising a fourth opening designed for the passage of the shaft, the washer having at least one notch designed to cooperate with this bead to block the washer from rotating relative to the principal body, and the washer comprises at least one projection or one recess and the corresponding part comprises at least one recess or projection, said projections and said corresponding recesses cooperating to block the part from rotating relative to the centering washer;

The device comprises two roughly planar parts, each having a third opening, each of these parts being designed to be positioned on either side of the principal body on an outer face of the structure so that the third opening is centered on the second opening for the passage of the shaft;

The insert has a base forming a single piece with the principal body, [and] one of the parts is this base;

It has a detachable head positioned at the other end of the shaft, the head being joined to the part onto which it is designed to be locked by a joining element;

Said head is a detachable head [and] said detachable head is a nut in one piece with a plate, said plate comprising drilled holes to receive fastening components such as rivets;

All of the elements of said device are made in one or more materials chosen from the group comprising steel, stainless steel, carbon steel, Inconel or any other material compatible with the high temperatures and loads transmitted from this part of the engine when the insert serves for an engine/system interface.

DRAWINGS

In different possible embodiments, the invention will be described in more detail with reference to the attached drawings in which:

FIG. 1 schematically represents a device of the prior art for securing an insert onto an engine mount yoke;

Figure 1:
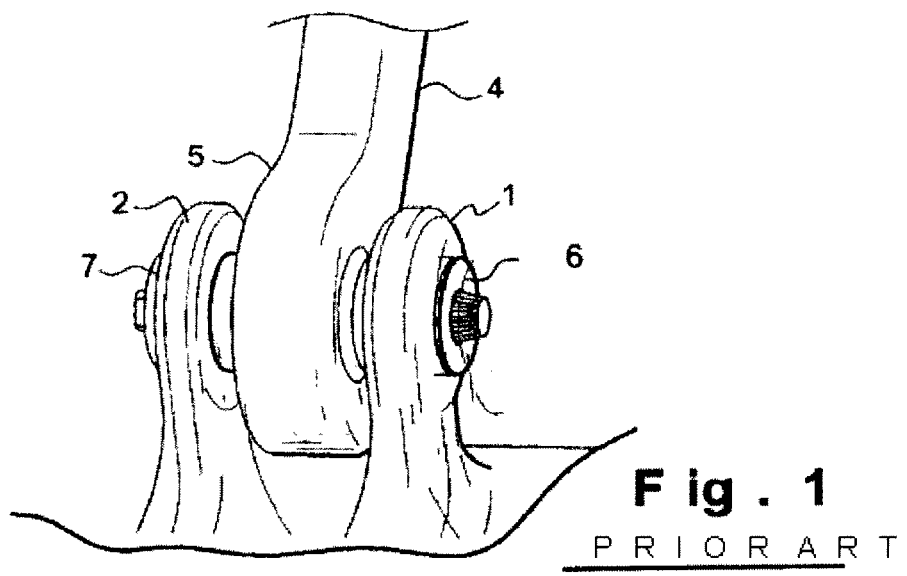
Figure 2:
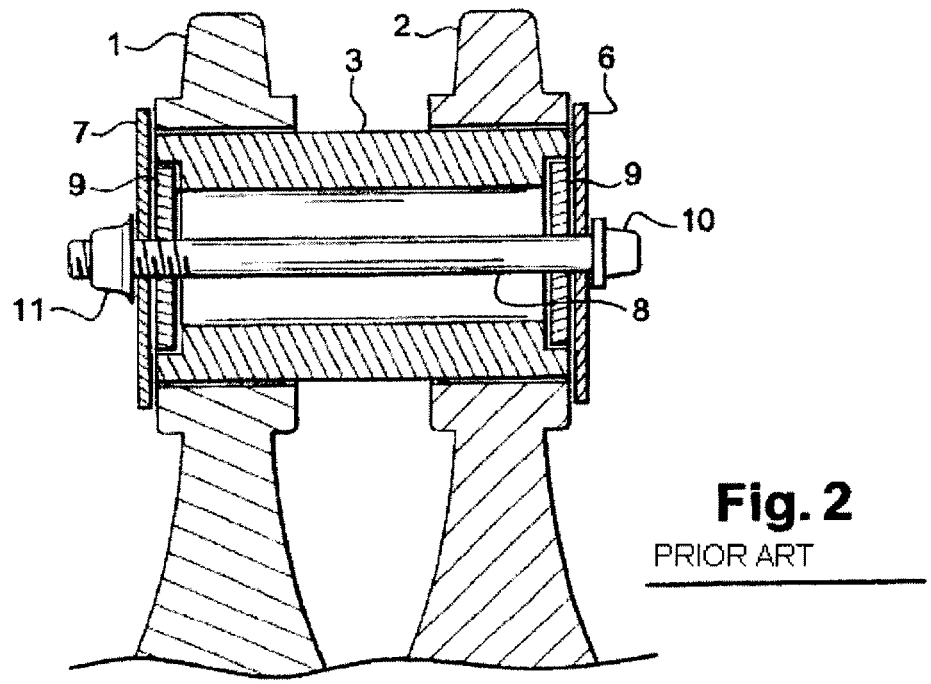
FIG. 2 is a sectional view of FIG. 1.
Figure 3:
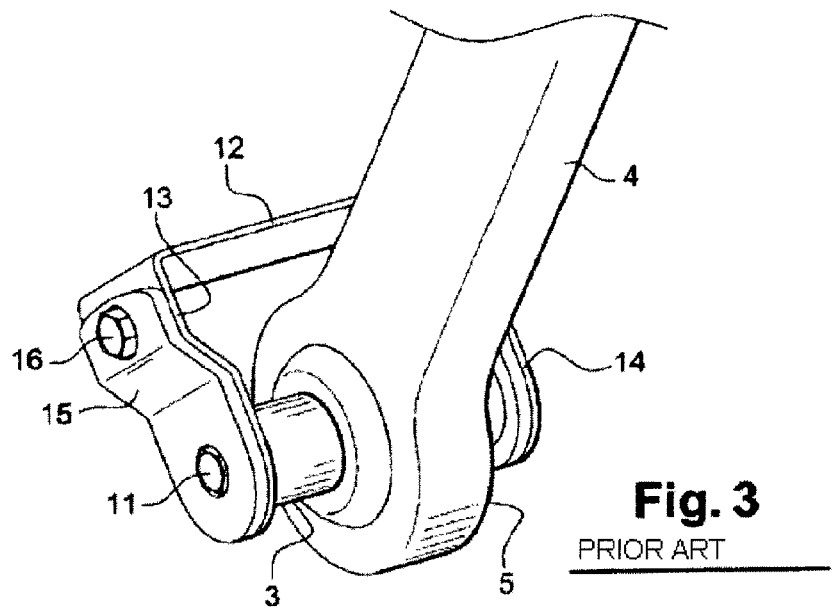
FIG. 3 is a schematic representation of another device of the prior art for securing an engine/system interface represented in FIGS. 1 and 2.
Figure 4:
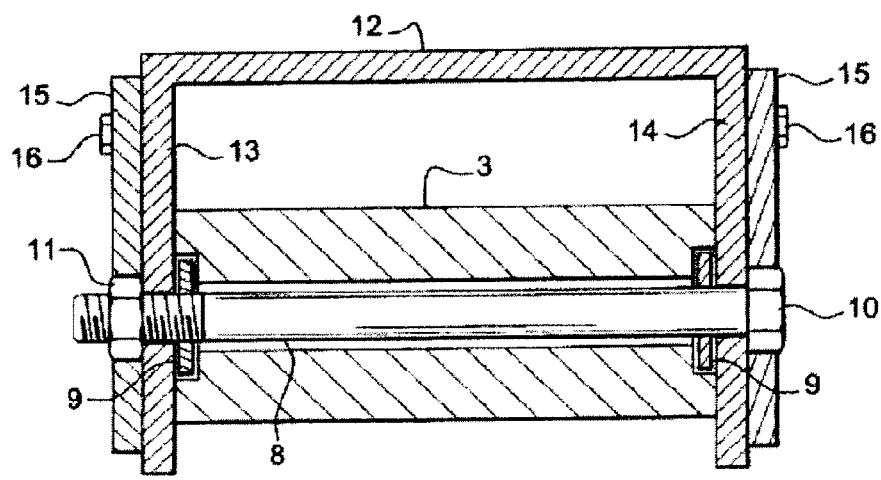
FIG. 4 is a sectional view of FIG. 3.
Figure 5:
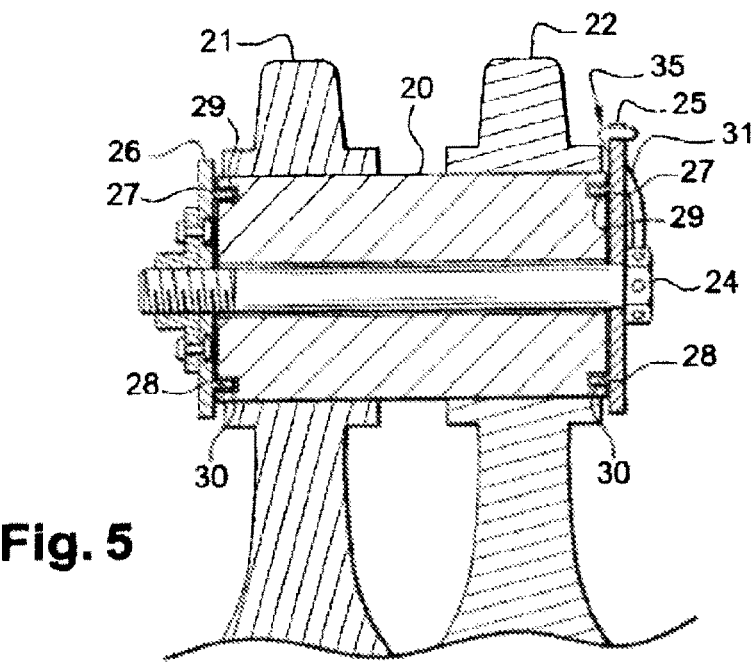
Figure 6A:
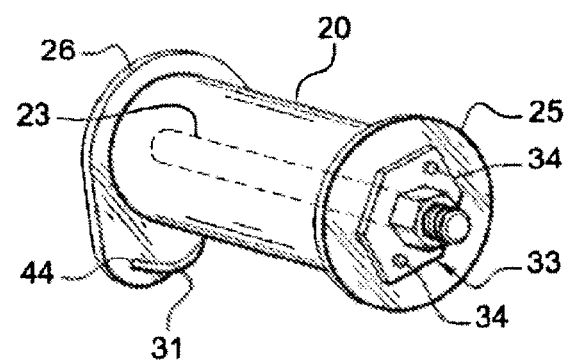
Figure 6B:
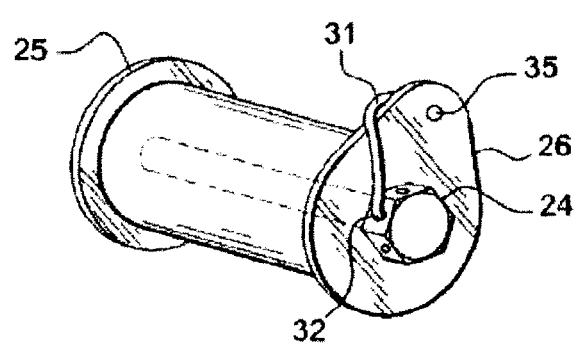
Figure 7:
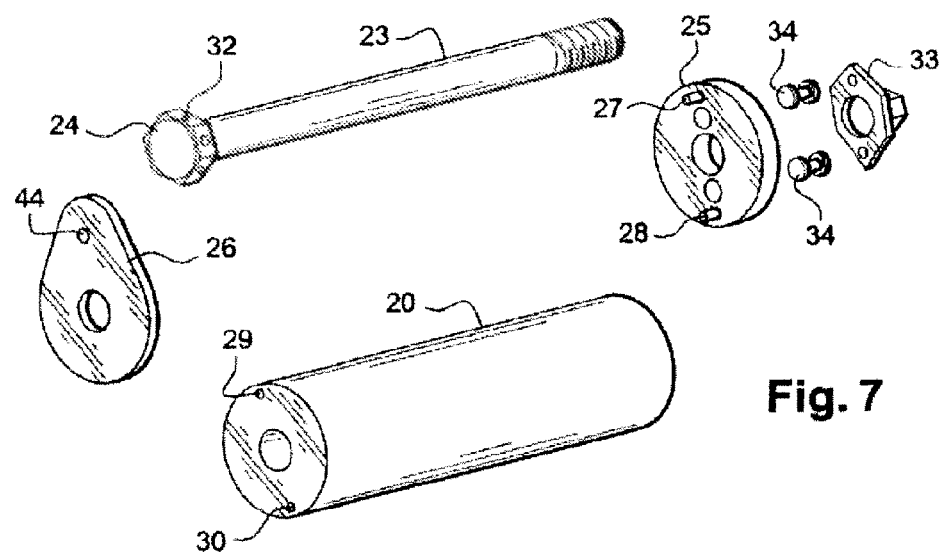
Figure 8:
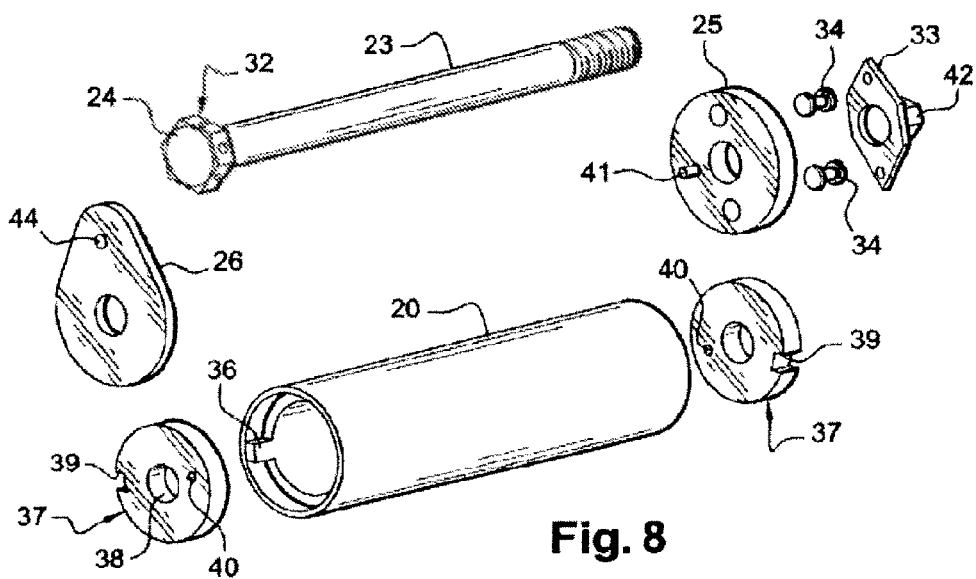
Figure 9:
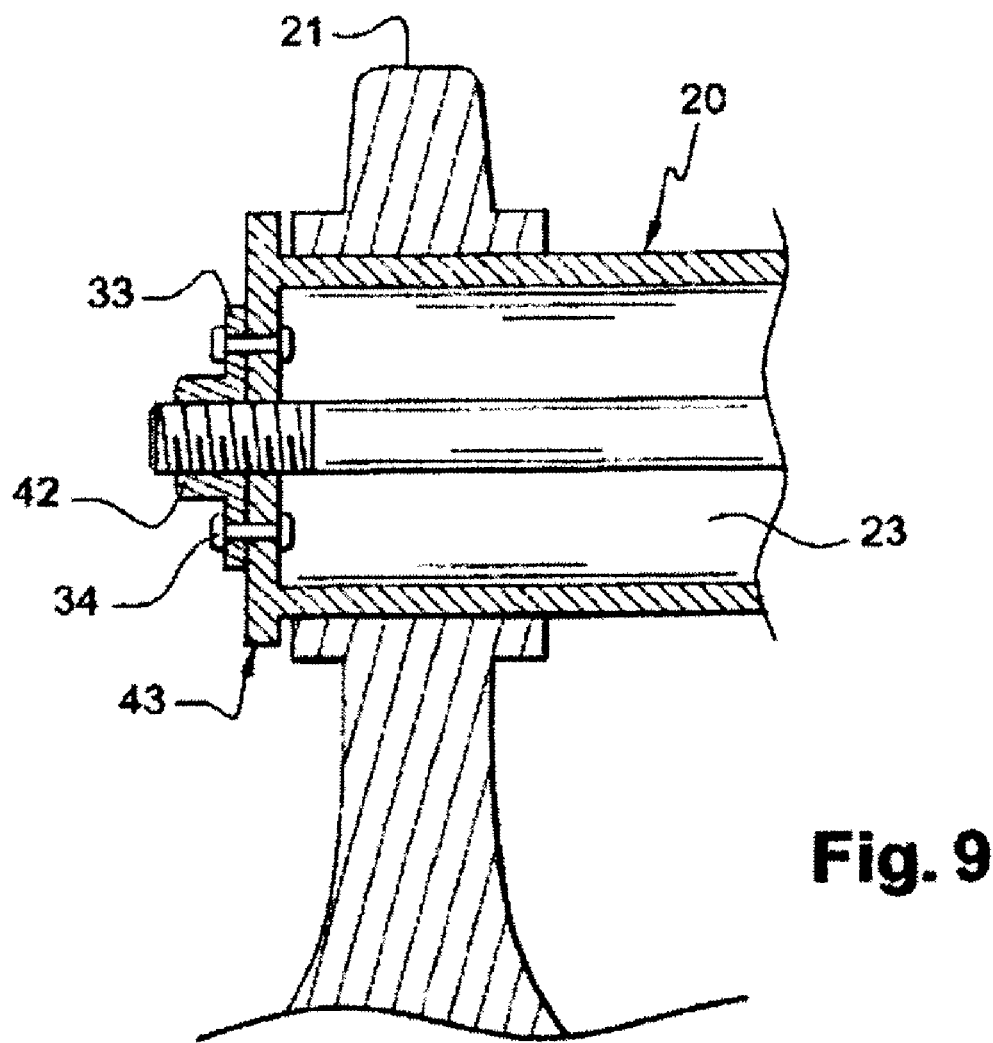

FIG. 5 schematically represents an insert fastened onto a structure, notably a yoke, by a securing device according to a first embodiment of the invention;

FIG. 6 is a profile view of the securing device of FIG. 5;

FIG. 7 is an exploded view of the securing device of FIG. 5;

FIG. 8 is a sectional view of an insert secured onto a structure, particularly a yoke, by a securing device according to a second embodiment of the invention;

FIG. 9 is a partial sectional view of an insert fastened onto a structure, particularly a yoke, by a securing device according to a third embodiment of the invention, in which the principal body of the insert has a base.

DETAILED DESCRIPTION

FIG. 5 shows an insert secured onto a structure, particularly a yoke, by a securing device according to a first embodiment of the invention. An insert 20 comprises a principal body that is inserted into an opening defined by two lugs 21, 22 of the yoke. This securing device comprises a shaft 23 passing into an opening of the principal body of the insert, this shaft having a head 24. It also comprises two planar parts 25, 26 having a third opening through which shaft 23 passes. These planar parts 25, 26 each take support on an outer face of the structure, i.e., lugs 21, 22, in order to keep principal body 20 inside the opening of the structure. The opening of each of planar parts 25, 26 is then centered on the opening of principal body 20 in order to permit the passage of fastening shaft 23.

The device comprises a system for blocking each of parts 25, 26 from rotating relative to principal body 20. This locking system has two projections 27, 28, for example pins, positioned on one face of each of planar parts 25, 26. These projections 27, 28 cooperate with corresponding recesses 29, 30 made in the ends of principal body 20 in order to join each of these parts with the principal body and thus prevent any rotation of these parts relative to principal body 20.

Alternatively, two recesses made on one face of each planar part 25, 26 cooperate with two corresponding projections made at the ends of principal body 20. The number of projections or recesses is, however, not limited and can be advantageously greater than two.

The device also comprises a first element for joining head 24 of shaft 23 onto planar part 25 on which it will be supported, as well as a second element for joining a nut that will secure the other planar part 26 onto the outer surface of lug 21. These joining elements permit locking each of the detachable or non-detachable heads onto the corresponding planar part 25, 26.

The first joining element is a safety wire 31 that is inserted on one side in a cavity 32 of head 24 of shaft 23 and, on the other side is joined to planar part 26. This safety wire 31 comprises, for example, at its end, a stop 35 that is inserted into a drilled hole 44 of planar part 26.

The second joining element is a plate 33 of one piece with the nut. This plate 33 comprises two drilled holes to receive fastening components such as rivets 34.

FIG. 7 represents an exploded perspective view of the securing device permitting the assembly of its elements to be easily distinguished.

FIG. 8 represents a securing device according to a second embodiment of the invention. The elements of FIG. 8 bearing the same references as the elements of FIGS. 5 to 7 represent the same objects.

This embodiment differs from the preceding one in that insert 20 has a hollow principal body that also has a more or less longitudinal bead 36 on its inner surface, this bead 36 being continuous or non-continuous. It may also involve bead portions placed only at the level of the ends of insert 20.

The locking system comprises two centering washers 37, comprising a fourth opening 38, designed for passage of said shaft 23. Each of said washers 37 has a notch 39 designed to cooperate with said bead 36 in order to block the corresponding centering washer 37 from rotation relative to principal body 20.

However, washers 37 can have two notches 39, or more, cooperating with more beads 36 or portions of bead in order to block centering washer 37 from rotating relative to principal body 20.

Each centering washer 37 also comprises a recess, here an opening 40 to receive a projection, such as a pin 41, placed on the corresponding planar part 25, 26. These projections 41 and these corresponding recesses 40 cooperate in order to block each planar part 25, 26 from rotating relative to the corresponding centering washer 37.

Again, detachable or non-detachable heads 24, 42 on shaft 23 are thus immobilized from rotation relative to the principal body 20 of the insert.

FIG. 9 shows a securing device according to a third embodiment of the invention. The elements of FIG. 9 bearing the same references as the elements of FIGS. 5 to 7 represent the same objects.

This insert is particular in that it has a hollow principal body 20 and a base 43 joined to this principal body 20. This base 43 and hollow principal body 20 form a single piece. One of the two planar parts 25, 26 described above in the first two embodiments is this base 43, which can be supported on the outer surface of one of the two lugs 21, 22.

As in the two first embodiments, this base 43 that replaces one of the two planar parts 25, 26 is joined to nut 42, taking support on its outer surface by a joining element housing a plate 33 and two rivets 34.

Alternatively, if base 43 is found on the side of a head 24 (not shown) forming a single piece with said shaft 23, then this head 24 is joined to base 43 by a joining element of the safety wire type 31 as described above.

Alternatively to all the embodiments previously described, the securing device does not have a head forming a single piece with shaft 23, but rather it comprises two detachable heads, for example nuts, each joined to a planar part, that are fastened to the planar part by means of fastening components such as rivets.

Alternatively, the joining element serving to join the detachable head to the corresponding planar part can be a safety wire inserted on one side into a cavity of said detachable head and joined on the other side to the planar part, for example, by a stop placed at the end of the safety wire.

The invention claimed is:

1. A device for securing an insert in a structure having a first opening, said insert having a principal body inserted into said first opening, said body having a first side, a second side and a second opening extending between the first and second sides, the second opening having a principal axis, said device comprising:
    a shaft configured to pass into the second opening from the first side of said body and through said second opening so that the shaft extends out of the second side of said body,
    at least one detachable or non-detachable head affixed to one end of the shaft,
    at least one roughly planar part having a third opening, said planar part being designed to be placed on an outer face of said structure so that said third opening is centered on said second opening for the passage of said shaft, said planar part, locking said insert in said first opening,
    a system for blocking said planar part from rotating relative to the principal body, and
    a joining element for joining said head onto said planar part to substantially nonrotatably lock said head onto said planar part, said head being designed to be supported against said planar part in order to secure the planar part against said outer surface, wherein the joining element is distinct from the head, one end of the joining element being configured to engage the head and the other end of the joining element being configured to engage the planar part to effect substantially nonrotatably locking the head onto the planar part.

2. The device according to claim 1, wherein said principal body comprises at least one projection or one recess positioned on at least one of its ends, while said locking system comprises at least one corresponding recess or projection positioned on said planar part, said projections and said corresponding recesses cooperating in order to join said planar part and said principal body.

3. The device according to claim 1, wherein said principal body (20) is hollow and has at least one longitudinal bead (36) on its inner surface, while said locking system has at least one centering washer (37) comprising a fourth opening designed for passage of said shaft (23), said washer (37) having at least one notch (39) designed to cooperate with said bead (36) in order to block said washer from rotating relative to said principal body (20),
    and in that said washer (37) comprises at least one projection (41) or one recess (40) and said corresponding part (25, 26, 43) comprises at least one recess (40) or one projection (41), said projections (41) and said corresponding recesses (40) cooperating to block said part (25, 26, 43) from rotating relative to said centering washer (37).

4. The device according to claim 1, further comprising two roughly planar parts each having a third opening, said planar parts being designed to each be positioned on either side of principal body on one outer face of said structure so that said third opening is centered on said second opening for passage of said shaft.

5. The device according to claim 4, further characterized in that said insert has a base (43) forming a single piece with said principal body (20), and one of said parts (25, 26, 43) is said base (43).

6. The device according to claim 1, further comprising a detachable head placed at the other end of shaft, said head being joined to said planar part on which it is designed to be locked by the joining element.

7. The device according to claim 1, wherein said joining element is a safety wire designed to be inserted at one end in a cavity of said detachable or non-detachable head, and joined at the other end to said planar part.

8. The device according to claim 1, wherein if said head is a detachable head, said detachable head is a nut joined to a plate, said plate comprising two drilled holes to receive fastening components.

9. The device according to claim 1, wherein all of said elements of said device are made of one or more chosen from the group comprising steel, stainless steel, carbon steel and Inconel.

* * * * *